(12) United States Patent
Altshuler

(10) Patent No.: US 9,869,828 B2
(45) Date of Patent: Jan. 16, 2018

(54) APPARATUS AND METHOD FOR REMOTELY ENGAGING AND DISENGAGING A CONNECTOR

(71) Applicant: Canon U.S.A., Inc., Melville, NY (US)

(72) Inventor: Alexander Altshuler, Cambridge, MA (US)

(73) Assignee: Canon U.S.A, Inc., Melville, NY (US)

( * ) Notice: Subject to any disclaimer, the term of this patent is extended or adjusted under 35 U.S.C. 154(b) by 0 days.

(21) Appl. No.: 15/594,446

(22) Filed: May 12, 2017

(65) Prior Publication Data

US 2017/0336578 A1    Nov. 23, 2017

Related U.S. Application Data

(60) Provisional application No. 62/338,301, filed on May 18, 2016.

(51) Int. Cl.
*G02B 6/38* (2006.01)
*H01R 43/26* (2006.01)

(52) U.S. Cl.
CPC ......... *G02B 6/3898* (2013.01); *G02B 6/3893* (2013.01); *H01R 43/26* (2013.01)

(58) Field of Classification Search
CPC ..... G02B 6/3898; G02B 6/3893; H01R 43/26
See application file for complete search history.

(56) References Cited

U.S. PATENT DOCUMENTS

| | | | |
|---|---|---|---|
| 6,517,373 B2 | 2/2003 | Finke et al. | |
| 6,540,533 B1 | 4/2003 | Schreiber | |
| 6,749,344 B2 | 6/2004 | Hamm et al. | |
| 6,877,906 B2 | 4/2005 | Mizukami et al. | |
| 6,920,275 B2 | 7/2005 | Chamorro et al. | |
| 7,074,066 B2 | 7/2006 | Pepe | |
| 7,292,764 B2 | 11/2007 | Morellec et al. | |
| 7,611,372 B2 | 11/2009 | Shen et al. | |
| 7,805,795 B2 | 10/2010 | Stein et al. | |
| 7,950,944 B1 | 3/2011 | Hertzler et al. | |
| 8,235,745 B1 | 4/2012 | Armstrong et al. | |
| 8,444,325 B2 | 5/2013 | Guest | |
| 8,465,317 B2 | 6/2013 | Gniadek et al. | |
| 8,585,426 B2 | 11/2013 | Zerebilov et al. | |
| 8,628,252 B2 * | 1/2014 | Matsumoto | G02B 6/3879 385/56 |
| 8,678,846 B2 | 3/2014 | Hitchcock et al. | |
| 8,845,344 B2 | 9/2014 | Ishiyama | |
| 9,502,824 B2 * | 11/2016 | Jordan | H01R 13/629 |
| 2002/0064983 A1 | 5/2002 | Patey | |

(Continued)

OTHER PUBLICATIONS

Badescu, M. et al., "Novel Smart Connector for Modular Robotics", Rutgers Univeristy.

(Continued)

*Primary Examiner* — Ellen Kim

(74) *Attorney, Agent, or Firm* — Canon U.S.A., Inc. IP Division

(57) ABSTRACT

An apparatus is provided that remotely manipulates a detachable device such a connector for a fiber optic connector. This apparatus comprising: a connector having two parts and a latch which are configured to engage and latch together in an engaged position when pressed in a direction of engagement. Two seats are configured to receive at least a portion of the connector.

11 Claims, 4 Drawing Sheets

(56) References Cited

U.S. PATENT DOCUMENTS

| | | |
|---|---|---|
| 2004/0132327 A1 | 7/2004 | Minota |
| 2007/0082533 A1 | 4/2007 | Currier et al. |
| 2008/0002345 A1 | 1/2008 | Carnevali |
| 2009/0052122 A1 | 2/2009 | Johnson et al. |
| 2011/0091163 A1 | 4/2011 | Shimotsu et al. |
| 2013/0009396 A1 | 1/2013 | Larsson et al. |
| 2014/0370736 A1 | 12/2014 | Laurent et al. |
| 2015/0194763 A1 | 7/2015 | Gagne et al. |
| 2015/0212282 A1 | 7/2015 | Lin |

OTHER PUBLICATIONS

"PowerLock and SnapLock High Current Power Connectors Catalog", veam; http://www.ittcannon.com/Core/medialibrary/ITTCannon/website/Literature/Catalogs-Brochures/ITT-VEAM-PowerLock-and-SnapLock-Catalog-112014-FlNAL-ToC2-V5.pdf?ext=.pdf.

\* cited by examiner

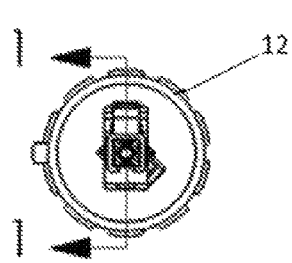
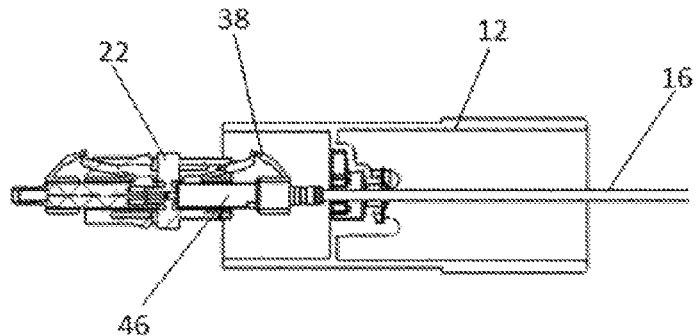
FIG. 5(A)  FIG. 5(B)
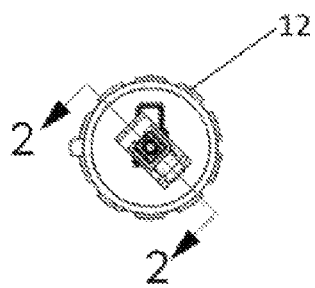
FIG. 6(A)
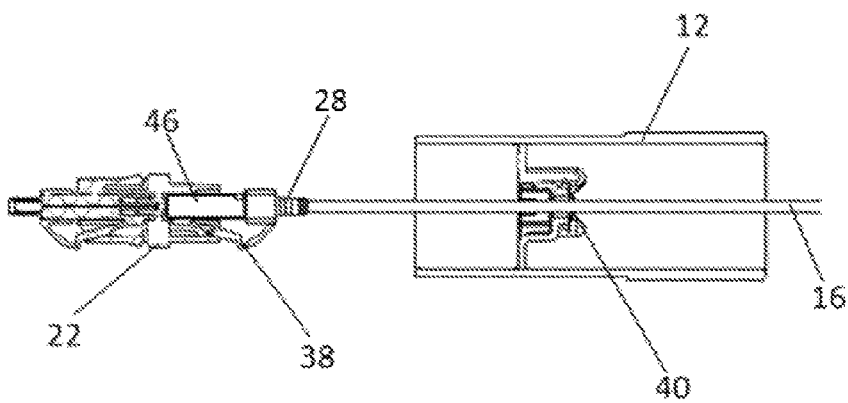
FIG. 6(B)

APPARATUS AND METHOD FOR REMOTELY ENGAGING AND DISENGAGING A CONNECTOR

CROSS-REFERENCE TO RELATED APPLICATION(S)

This application claims priority to U.S. Provisional Application Ser. No. 62/338,301 filed 18 May 2016, the content of which is incorporated herein by reference in its entirety.

FIELD OF THE DISCLOSURE

The present disclosure relates generally to apparatus and method for remotely engaging a connector and, more particularly to remotely engaging and disengaging an electrical or fiber optic connector for transmission of signals or media, including gases, liquids, light and current.

BACKGROUND OF THE DISCLOSURE

Push-in latching connectors such as RJ-xx electrical connectors, LC and E2000 optical fiber connectors, or connectors for transmitting other types of signals or media, such as gases or liquids, are incorporated in a multitude of industries for use with a wide array of machinery and components. Everything from medical instruments, to musical instruments and automotive componentry incorporate plug-in connectors. Accordingly, a majority of these connectors are designed to be plugged and unplugged manually. However, in some applications there is a need for manipulation of these connectors remotely (i.e. without being touched by an operator). Various applications may call for a sterile environment, or involve sensitive instruments which may be upset by excess movement. For example, it would be advantageous to connect a rotating optical fiber of an imaging medical endoscope to the main unit with a standard fiber optic connector, but without physically contacting the connectors. Currently, the common solution to this challenge is to create a custom fiber connection system that would allow such remote operation, laid open in U.S. Pat. Nos. 6,749,344 and 6,920,275. However, performance and reliability of such prior art connector requires specialized components, which are often costly, and further require time consuming verification testing, leading to additional cost and time delays.

SUMMARY

Accordingly, the present disclosure provides an apparatus and method for using the apparatus, capable of remote engagement and disengagement of a connector such as an optical fiber connector.

In one exemplary embodiment the apparatus for remotely engaging and/or disengaging a latchable connector. The apparatus includes a connector having a first part, a second part, and a latch, which are configured to engage and latch together in an engaged position when pressed in a direction of engagement, a housing having two distinct seats, a first seat and a second seat, each seat configured to receive at least a portion of the connector, and a drive configured to impart mechanical motion on at least one of the first part and the second part of the connector. The first seat is configured not to interfere with the latch and the second seat is configured to unlatch the first part and the second part of the connector, and the drive is configured to position the connector into the two distinct seats.

In some exemplary embodiments, the apparatus remotely engages and disengaged a fiber optic connector.

In another embodiment of the present disclosure, the latch is configured to be activated by a resilient member (e.g., a spring) incorporated into the connector and may also or alternatively be configured to be deactivated by depressing a locking lever incorporated into the connector.

In further embodiments, the second seat is configured for depressing the locking lever, which may be depressed with a ramp. The two seats may be superimposed on the same axis and at a predetermined angle relative to each other. In further exemplary embodiments the unlocking ramp unlocks the locking lever only if the detachable device is situated in the second seat.

According to a further exemplary embodiment of the present disclosure, the drive imparts a rotational motion about an axis parallel to the direction of engagement on the first connector part. In other exemplary embodiments, the drive imparts a linear motion along the direction of engagement.

In further embodiments, the second connector part is immobilized after latch disengagement. In yet other embodiments, the apparatus may be capable of rotation about the center axis of the connector while retaining the detachable device.

In one exemplary embodiment the apparatus for remotely manipulating a detachable device includes a connector having an interior housing, with a seat situated on the interior housing, and a cavity situated on the interior housing, wherein the seat and cavity are configured to receive a detachable device, with the cavity being deeper than the seat. The seat may be positioned about the center axis of the connector, and configured to receive the detachable device at or about a specific angle about the center axis of the connector. Furthermore, the cavity may be positioned about the center axis of the connector, and configured to receive the detachable device at or about a specific angle about the center axis of the connector.

These and other objects, features, and advantages of the present disclosure will become apparent upon reading the following detailed description of exemplary embodiments of the present disclosure, when taken in conjunction with the appended drawings, and provided paragraphs.

BRIEF DESCRIPTION OF THE DRAWINGS

Further objects, features and advantages of the present invention will become apparent from the following detailed description when taken in conjunction with the accompanying figures showing illustrative embodiments of the present invention.

FIG. 5(A) provides a front view of the subject connector, in accordance with one or more embodiments of the subject disclosure. FIG. 5(B) provides a sectional side view of the subject connector in the protracted position, and optic fiber receiver, in accordance with one or more embodiments of the subject disclosure.

FIG. 6(A) provides a front view of the subject connector, in accordance with one or more embodiments of the subject disclosure. FIG. 6(B) provides a sectional side view of the subject connector in the retracted position, and optic fiber receiver, in accordance with one or more embodiments of the subject disclosure.

Figure 1:
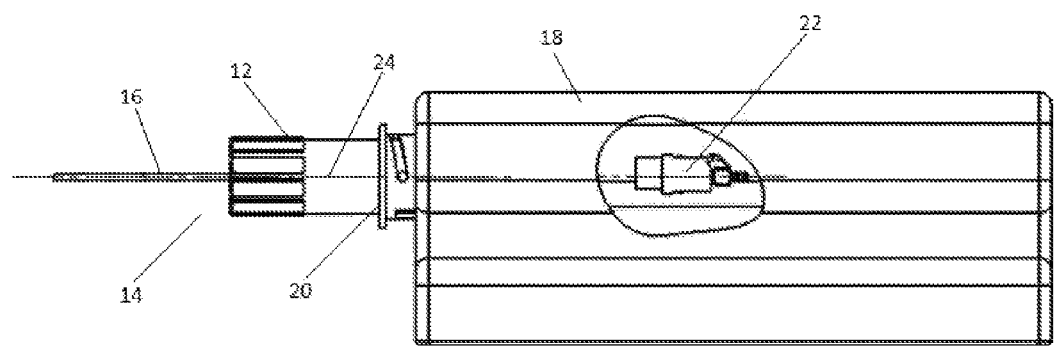
FIG. 1 depicts a side view of the subject connector and receiving unit, including a partial sectional view of one or more components, in accordance with one or more embodiments of the subject disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative embodiments. It is intended that changes and modifications can be made to the described embodiments without departing from the true scope and spirit of the subject disclosure as defined by the appended paragraphs.

DETAILED DESCRIPTION OF THE DISCLOSURE

FIG. 1 depicts a side view of the subject connector and receiving unit, including a partial sectional view of one or more components within the receiving unit, in accordance with one or more embodiments of the subject disclosure. The subject connector 12 illustrated in this embodiment is used to join a detachable device 14, comprising a fiber optic connector 46 (see FIG. 4(B)) and optic fiber 16, to a receiving unit 18. The detachable device 14 gains access into the receiving unit 18 via an opening 20, adapted to receive the connector 12. The receiving unit 18 contains an optic fiber receiver 22 for mating with the optic fiber 16, and a means for rotating that mating connector about the central axis 24 of the connector 12. The receiving unit 18 further comprises a motorized linear stage for translating that mating connector about an axis 24 central to the connector 12. An exemplary means for rotating the mating connector may include an electric motor, or similar device.

Although the embodiment illustrated in FIG. 1 incorporates a bayonet style connector 12, requiring rotation of the connector about the axis of the optic fiber 16, it is contemplated that any and all types of connectors may be subject to the present disclosure, including latching connectors, compression fittings, modular connectors, plug-to-jack connectors, TDO connectors, combinations thereof and derivatives therefrom.

Figure 2:
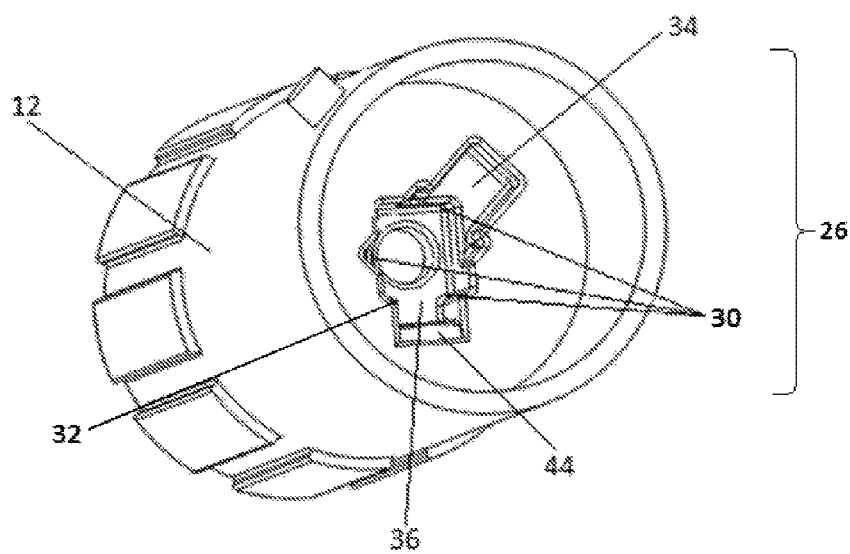
FIG. 2 provides a front perspective view of the subject connector, in accordance with one or more embodiments of the subject disclosure.

FIG. 2 provides a front perspective view of the subject connector 12, in accordance with one or more embodiments of the subject disclosure. FIG. 2 details the inner layout of the subject connector 12, and more specifically, the mechanism for accomplishing the at least two positions (retracted and protracted) of the detachable device 14 within the connector 12. The connector 12 comprises a connector housing 26. Within the connector housing 26, there are two engagement positions, each having a different depth value, identified as a first seat 34, and a second seat 36. In the illustrated embodiment, the first seat 34 and second seat 36 overlap one another, and are positioned about the center axis 24 of the connector 12. Each of the first seat 34 and second seat 36, are configured to receive the distal end 28 (see FIG. 6(B)) of the fiber optic connector 46. The first seat 34 and second seat 36 are each positioned at specific and differing angles, with respect to one another, about the center axis 24, and are configured to receive a fiber optic connector 46 introduced to, or sufficiently close to, their corresponding angles.

The first seat 34 is configured to receive the fiber optic connector 46 in the protracted position, which is utilized for mating the fiber optic connector 46 to the optic fiber receiver 22. The second seat 36 is configured to receive the fiber optic connector 46 in the retracted position, which is utilized for disengaging the fiber optic connector 46 from the optic fiber receiver 22. The first seat 34 and second seat 36 has corresponding pockets 30 and 32, respectively, for supporting the fiber optic connector 46. Pocket 30 of the first seat 34 has a clearance fit around the locking lever of the fiber optic connector 46.

The second seat 36 may further comprise a ramp 44 adapted to interfere with the locking lever 38 of the fiber optic connector 46, thus pressing on the locking lever 38 to support disengagement of the fiber optic connector 46 with the optic fiber receiver 22. The second seat is situated on the housing, where the first seat 34 and second seat 36 are configured to receive a detachable device (at least a portion of the connector), with the second seat being deeper than the first seat.

In various embodiments, engagement and disengagement of the fiber optic connector 46 with the receiver 22 utilizes a latch mechanism (referred to herein as "latch" or "latchable") which differs from a detachable mechanism, in that the latch requires manipulation of the latch mechanism to allow for disengagement. Embodiments of the aforementioned latch mechanism are well known in the state of the art and usually includes, for example, a resiliently bendable lever with a detent, such as the locking lever 38, in conjunction with a detent catch configured to accept the detent in the optic fiber receiver 22.

With respect to FIGS. 3(A) through 8(B), various steps of engagement and disengagement of the connector 12 with the detachable device 14, as well as engagement and disengagement of the detachable device 14 with the optic fiber receiver 22 (receiving unit 18), are provided. Although a chronological series of steps for engagement and disengagement of the connector 12 has been provide, it is understood that each step may be substituted, reordered, omitted, and/or combined to accomplish similar engagement and/or disengagement of the connector 12, detachable device 14, and receiving unit 18.

Figure 3A:
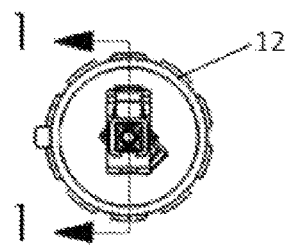
FIG. 3(A) provides a front view of the subject connector, in accordance with one or more embodiments of the subject disclosure.
Figure 3B:
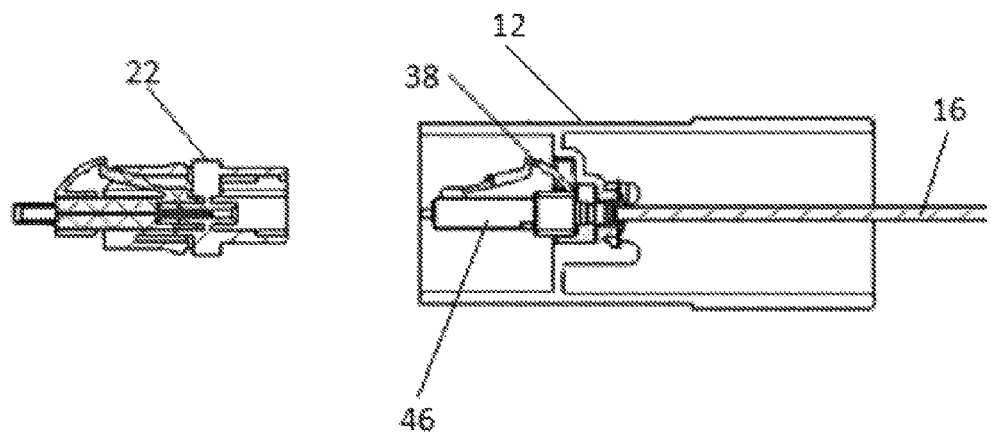
FIG. 3(B) provides a sectional side view of the subject connector in the protracted position, and optic fiber receiver, in accordance with one or more embodiments of the subject disclosure.

FIG. 3(A) provides a front view of the subject connector 12 oriented in the protracted position 1-1, and FIG. 3(B) provides a sectional side view of the subject connector 12 in the same orientation. While FIG. 3(A) provides the rotational position of the connector 12 about the axis 24, FIG.

3(B), provides the positioning of the detachable device 14 (comprising of the fiber optic connector 46 and optic fiber 16) within the connector 12. As you can see, the detachable device 14 is in the protracted position 1-1 corresponding with the first seat 34. Accordingly, the detachable device 14 may be fitted into the connector 12 in the protracted position. The locking lever 38 is open and in position to receive the optic fiber receiver 22 (please note that the receiving unit 18 housing the optic fiber receivers 22 has not been shown to promote clarity and simplicity). As depicted in FIG. 3(B), the optic fiber receiver 22 is adjacent to the connector 12, and awaits attachment.

Figures 4A, 4B:
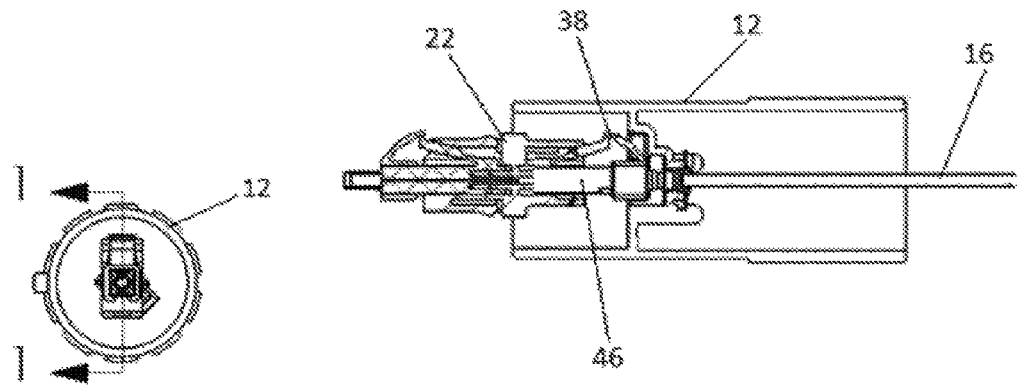
FIG. 4(A) provides a front view of the subject connector, in accordance with one or more embodiments of the subject disclosure.
FIG. 4(B) provides a sectional side view of the subject connector in the protracted position, and optic fiber receiver, in accordance with one or more embodiments of the subject disclosure.

FIG. 4(A) provides the rotational position of the connector 12 depicted in FIG. 4(B). Whereas, FIG. 4(B) illustrates the detachable device 14 coupled to the optic fiber receiver 22, with the assembled detachable device 14 and optic fiber receiver 22 residing within the connector 12. Furthermore, the locking lever 38 of the detachable device 14 is now engaged with the optic fiber receiver 22, resolving the coupling.

FIG. 5(B) provides a sectional side view of the next operational step of the subject connector 12, in the protracted position, with the assembled detachable device 14 and optic fiber receiver 22. Specifically, FIG. 5(B) illustrates retraction of the fiber connector 46 locked into the fiber optic receiver 22 from the cavity of the connector 12.

Furthermore, FIG. 5(B) details retention of the detachable device 14 by the connector 12, which allows for rotational manipulation of the connector 12 about the optic fiber 16, allowing the connector 12 to be positioned for receiving the second seat 36 or first seat 34, while the detachable device 14 is retained by the connector 12. FIGS. 5(A) and 6(A) further detail a typical rotation of the connector 12 about the center axis 24, while the optic fiber 16 is retained by the connector 12.

FIGS. 6(A) through 8(B) provide illustrations for incorporating the subject connector 12 for disengaging a detachable device 14 from a receiving unit 18.

FIG. 6(A) provides a front view of the subject connector in the retracted position 2-2, which corresponds with the second seat 36, and FIG. 6(B) provides a sectional side view of the subject connector 12 in the retracted position, with the assembled detachable device 14 and optic fiber receiver 22 situated adjacent to the connector 12. Furthermore, connector 12 is shown to be engaged upon the optic fiber 16 of the detachable device 14.

Figure 7A:
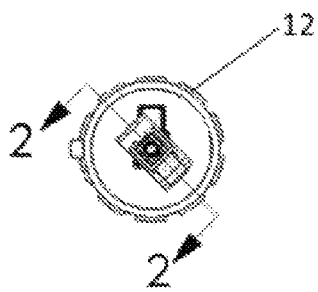
FIG. 7(A) provides a front view of the subject connector, in accordance with one or more embodiments of the subject disclosure.
Figure 7B:
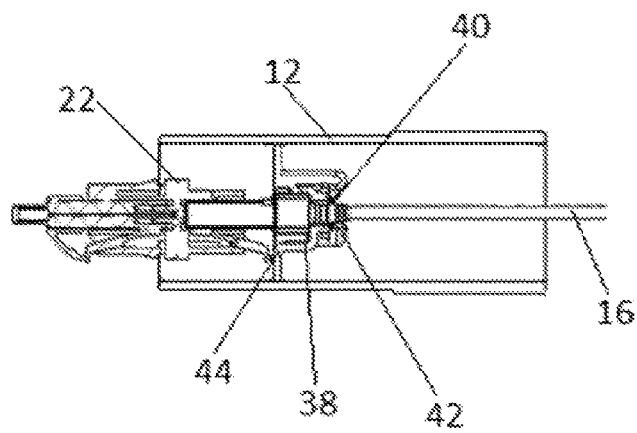
FIG. 7(B) provides a sectional side view of the subject connector in the retracted position, and optic fiber receiver, in accordance with one or more embodiments of the subject disclosure.
Figure 8A:
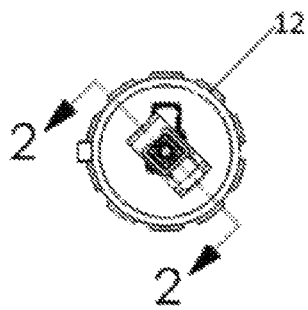
FIG. 8(A) provides a front view of the subject connector, in accordance with one or more embodiments of the subject disclosure.
Figure 8B:
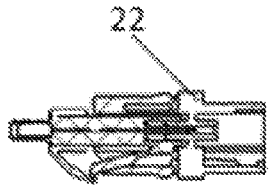
FIG. 8(B) provides a sectional side view of the subject connector in the retracted position, and optic fiber receiver, in accordance with one or more embodiments of the subject disclosure.
Figure 8B:
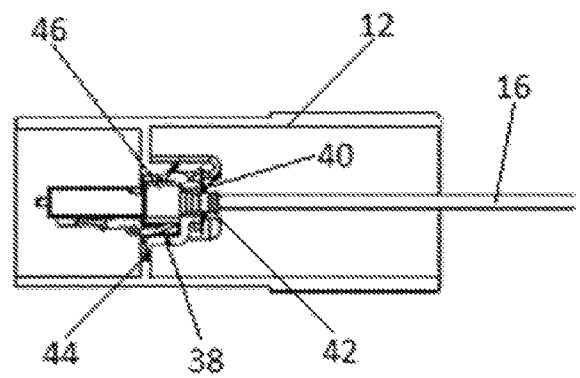

While maintaining the angular position of the connector 12, the assembled detachable device 14 and optic fiber receiver 22 is fitted into the second seat 36 of the connector 12, with the distal end 28 of the fiber optic connector 46 engaging the second seat 36 first. As illustrated in FIG. 7b the assembled detachable device 14 and optic fiber receiver 22 are linearly urged into the connector housing 26, so as to engage the second seat 36. Upon sufficient entry of the fiber optic connector 46 into the second seat 36, the distal end 28 of the optic fiber connector 46 engages the unlocking ramp 44, which releases the locking lever 38 of the fiber optic connector 46 of the detachable device 14, thus disengaging the detachable device 14 from the optic fiber receiver 22 and receiving unit 18. Upon engagement of the detachable device 14 with the connector 12, as portrayed in FIG. 8(B), an exit tube 42, approximate to the distal end 28 of the fiber optic connector 46, engages a shaft receiving washer 40, which is secured inside the connector 12. The shaft receiving washer 40 axially secures the detachable device 14 in the connector 12, via the exit tube 42, resulting the disengagement of the detachable device 14 from the receiving unit 18.

In further embodiments, the unlocking ramp 44 may also provide separation of the optic fiber receiver 22 from the receiving unit 18 and/or connector 12.

The invention claimed is:

1. An apparatus for remotely engaging and disengaging a latchable connector comprising:
    a connector having a first part, a second part, and a latch, which are configured to engage and latch together in an engaged position when pressed in a direction of engagement;
    a housing having two distinct seats, a first seat and a second seat, each seat configured to receive at least a portion of the connector;
    at least one drive which is configured to impart mechanical motion on at least one of the first part and the second part of the connector;
    wherein the first seat is configured not to interfere with the latch and the second seat is configured to unlatch the first part and the second part of the connector, and
    wherein the drive is configured to position the connector into the two distinct seats.

2. The apparatus according to claim 1, wherein the latch is configured to be activated by a resilient member incorporated into the connector.

3. The apparatus according to claim 2, wherein the latch is configured to be deactivated by depressing a locking lever incorporated into the connector.

4. The apparatus according to claim 3, wherein the second seat is configured for depressing the locking lever.

5. The apparatus according to claim 4, wherein the second seat is configured for depressing the locking lever with a ramp.

6. The apparatus according to claim 1, wherein the first and the second seats are superimposed on the same axis and at a predetermined angle relative to each other.

7. The apparatus according to claim 6, wherein the drive is configured to impart on the first connector part a rotational motion about an axis parallel to the direction of engagement.

8. The apparatus according to claim 6, wherein the drive is configured to impart on the first connector part a linear motion along the direction of engagement.

9. The apparatus according to claim 1, further comprising a retention feature configured to immobilize the second connector part after latch disengagement.

10. The apparatus according to claim 1, wherein the connector is configured to connect optical fibers.

11. An apparatus for remotely engaging and disengaging a latchable fiber optic connector comprising:
    a fiber optic connector having a first part, a second part, a latch, a resilient member, and a locking lever, wherein the first part and the second part are configured to engage and latch together in an engaged position when pressed in a direction of engagement, and wherein the latch is configured to be activated by the resilient member and to be deactivated by the locking lever;
    a housing having two distinct seats, a first seat and a second seat, the first seat configured to receive at least a portion of the connector and the second seat configured to depress the locking lever with a ramp;
    at least one drive which is configured to impart mechanical motion on at least one of the first part and the second part of the connector;
    wherein the first seat is configured not to interfere with the latch and the second seat is configured to unlatch the first part and the second part of the connector, and wherein the drive is configured to position the connector into the two distinct seats.

* * * * *